(12) United States Patent
Ma et al.

(10) Patent No.: US 12,338,869 B1
(45) Date of Patent: Jun. 24, 2025

(54) SHOCK ABSORBING DEVICE

(71) Applicant: Guangdong Shuowei Technology Co., Ltd, Dongguan (CN)

(72) Inventors: Wenhong Ma, Dongguan (CN); Lei Luo, Dongguan (CN); Hui Xia, Dongguan (CN); Lei Liu, Dongguan (CN)

(*) Notice: Subject to any disclaimer, the term of this patent is extended or adjusted under 35 U.S.C. 154(b) by 0 days.

(21) Appl. No.: 18/976,823

(22) Filed: Dec. 11, 2024

(30) Foreign Application Priority Data

Sep. 10, 2024 (CN) .......................... 202422220745.0

(51) Int. Cl.
  *F16F 15/02* (2006.01)
  *F16F 1/36* (2006.01)
  *F16F 1/373* (2006.01)

(52) U.S. Cl.
  CPC ............ *F16F 1/373* (2013.01); *F16F 1/3605* (2013.01); *F16F 2224/025* (2013.01); *F16F 2230/0005* (2013.01); *F16F 2238/026* (2013.01)

(58) Field of Classification Search
  CPC .... F16F 1/373; F16F 1/3605; F16F 2224/025; F16F 2230/0005; F16F 2238/026
  USPC .......................... 248/636–638; 267/152, 153
  See application file for complete search history.

(56) References Cited

U.S. PATENT DOCUMENTS

| | | | | |
|---|---|---|---|---|
| 2,979,297 A | * | 4/1961 | Suozzo | F16L 3/2053 248/575 |
| 3,268,199 A | * | 8/1966 | Kordyban | F17C 13/086 248/580 |
| 3,794,277 A | * | 2/1974 | Smedley | H02B 1/54 248/548 |
| 8,307,586 B2 | * | 11/2012 | Tsai | E04H 9/023 248/562 |
| 11,339,849 B2 | * | 5/2022 | Zhou | F16F 15/022 |

FOREIGN PATENT DOCUMENTS

WO  WO-2023098514 A1 * 6/2023 ................ F16F 3/04

* cited by examiner

*Primary Examiner* — Christopher P Schwartz
(74) *Attorney, Agent, or Firm* — Daniel M. Cohn; Howard M. Cohn.

(57) ABSTRACT

A shock absorbing device comprises a shock absorbing device body, which comprises an upper shock absorbing cover and a lower shock absorbing cover, a primary shock absorbing element and a secondary shock absorbing element located on the outside of a circle of the primary shock absorbing element are arranged between the upper shock absorbing cover and the lower shock absorbing cover; a tower spring is matched with a plurality of shock absorbing silicones to effectively reduce the shock transfer between the upper shock absorbing cover and the lower shock absorbing cover; the upper shock absorbing cover and the lower shock absorbing cover are not directly connected with mother and child limit screws, but are connected with the mother and child limit screws through the shock absorbing silicones; a shock absorbing spring can assist the shock absorbing silicones to buffer the shock and shape the shock absorbing silicone.

5 Claims, 6 Drawing Sheets

SHOCK ABSORBING DEVICE

TECHNICAL FIELD

The utility model relates to the technical field of support accessories for electronic products, in particular to a shock absorbing device.

BACKGROUND ART

Hands-free use of intelligent devices such as mobile phones or tablet computers is usually realized through a support. The support can adjust the angle of intelligent devices, making it more convenient for users to use them. Meanwhile, the support can also be used in mobile scenes such as cars, yachts, motorcycles and bicycles. A shock absorbing structure needs to be arranged on the support to reduce the damage to the intelligent devices in the mobile scenes, but the existing shock absorbing structure of the support still has the following defects in use:

the existing support shock absorbing mechanisms mostly use a single rubber shock absorber, which has a simple structure, but has poor shock absorbing effect, and cannot effectively cushion the shock of the intelligent devices and reduce the shock damage, so that the use effect is unsatisfactory.

SUMMARY OF THE UTILITY MODEL

In order to realize the above purposes, the utility model provides the following technical proposal: a shock absorbing device comprises a shock absorbing device body, which comprises an upper shock absorbing cover and a lower shock absorbing cover, a primary shock absorbing element and a secondary shock absorbing element located on the outside of a circle of the primary shock absorbing element are arranged between the upper shock absorbing cover and the lower shock absorbing cover, the upper shock absorbing cover and the lower shock absorbing cover are connected with each other through the secondary shock absorbing element, and universal connectors are arranged at the top of the upper shock absorbing cover and the bottom of the lower shock absorbing cover.

As an optimal technical proposal of the utility model, the primary shock absorbing element is a tower spring.

As an optimal technical proposal of the utility model, the secondary shock absorbing element comprises shock absorbing silicones, mother and child limit screws sleeved inside the shock absorbing silicones and shock absorbing springs sleeved outside the mother and child limit screws and located inside the shock absorbing silicones.

As an optimal technical proposal of the utility model, annular clamping slots are arranged at both ends of the shock absorbing silicone.

As an optimal technical proposal of the utility model, the mother and child limit screw comprises a mother screw and a child screw, the mother screw and the child screw are respectively inserted into the shock absorbing silicone from both ends of the shock absorbing silicone and then riveted for fixing, and nuts of the mother screw and the child screw are respectively stuck at both ends of the shock absorbing silicone, and a hexagonal socket is arranged inside the nut.

As an optimal technical proposal of the utility model, the universal connector comprises a universal male connector arranged at the top of the upper shock absorbing cover and a universal female connector arranged at the bottom of the lower shock absorbing cover.

As an optimal technical proposal of the utility model, a conical boss is arranged at the top of the lower shock absorbing cover, and the bottom of the primary shock absorbing element is movably clamped with the conical boss.

As an optimal technical proposal of the utility model, a stepped hole is arranged at the bottom of the upper shock absorbing cover, a flat gasket is arranged inside the stepped hole, and the top of the primary shock absorbing element extends to the inside of the stepped hole.

As an optimal technical proposal of the utility model, a nut is fixedly embedded inside the universal female connector.

As an optimal technical proposal of the utility model, countersunk holes sleeved with the annular clamping slots at both ends of the shock absorbing silicone respectively are arranged inside support arms around the upper shock absorbing cover and the lower shock absorbing cover.

Compared with the prior art, the utility model provides a shock absorbing device, which has the following beneficial effects:

for the shock absorbing device, a tower spring is matched with a plurality of shock absorbing silicones to effectively reduce the shock transfer between the upper shock absorbing cover and the lower shock absorbing cover; the upper shock absorbing cover and the lower shock absorbing cover are not directly connected with mother and child limit screws, but are connected with the mother and child limit screws through the shock absorbing silicones to avoid rigid shock transfer between the upper shock absorbing cover and the lower shock absorbing cover and provide better shock absorbing effect; a shock absorbing spring can assist the shock absorbing silicones to buffer the shock and shape the shock absorbing silicones, so that the shock absorbing silicones can still maintain good integrity in the shock environment for a long time, and can be quickly restored after deformation, thereby being more durable in use and meeting the use requirements of the users.

BRIEF DESCRIPTION OF THE DRAWINGS

One or more embodiments are exemplarily illustrated by corresponding drawings, these exemplary illustrations and drawings do not constitute a restriction to the embodiments, elements having the same reference signs in the drawings are shown as similar elements, and the drawings do not constitute a scale restriction.

Figure 1:
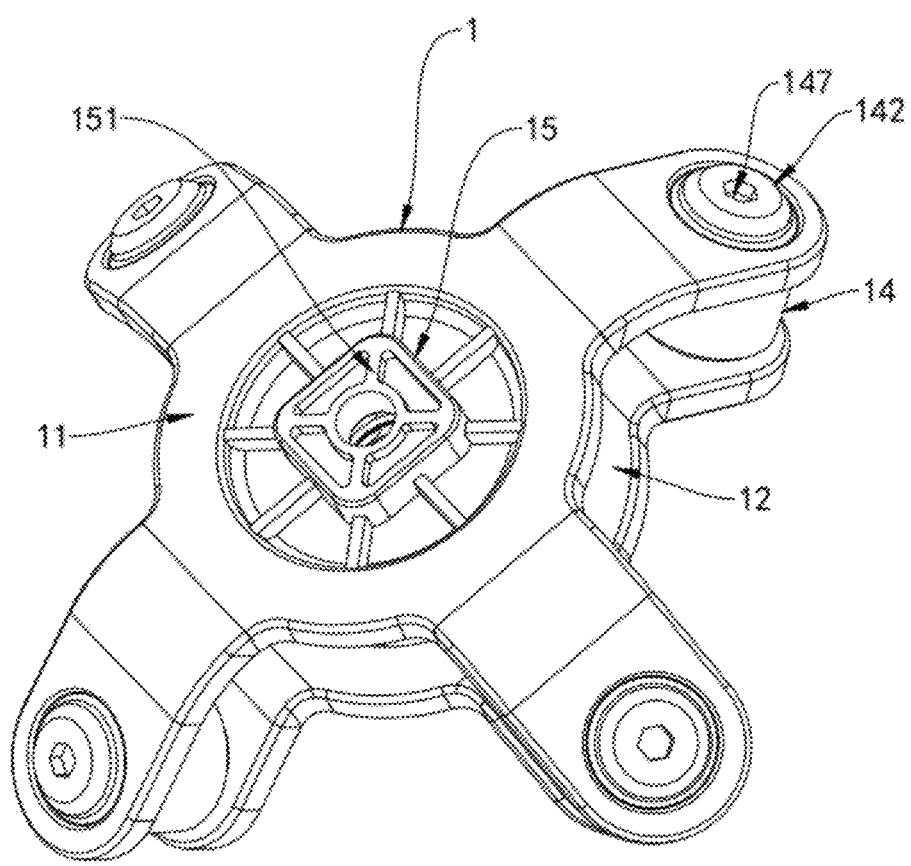
FIG. 1 is the structural diagram for a shock absorbing device proposed by the utility model.

Reference signs: 1. Shock absorbing device body; 11. Upper shock absorbing cover; 12. Lower shock absorbing cover; 13. Primary shock absorbing element; 14. Secondary shock absorbing element; 141. Shock absorbing silicone; 142. Mother and child limit screw; 143. Shock absorbing spring; 144. Annular clamping slot; 145. Mother screw; 146. Child screw; 147. Hexagonal socket; 15. Universal connector; 151. Universal male connector; 152. Universal female connector; 16. Conical boss; 17. Stepped hole; 171. Flat gasket; 18. Nut; 19. Countersunk hole.

DETAILED DESCRIPTION OF THE UTILITY MODEL

To understand of the characteristics and technical contents of the embodiments in the disclosure in more detail, the realization of the embodiment in the disclosure is described in detail in combination with the drawings. The drawings are for reference purposes only and are not used to limit the embodiments of the disclosure. In the following technical description, for ease of explanation, a number of details are provided to fully understand the disclosed embodiments. However, in the absence of these details, one or more embodiments may still be implemented. In other cases, familiar structures and devices may be shown simplistically to simplify the drawings.

The terms such as "first" and "second" in the specification and claims of the disclosure and in the drawings above are used to distinguish similar objects and are not necessarily used to describe a particular sequence or precedence order. Understandably, such data used are interchangeable where appropriate for the purposes of embodiments of the disclosure described herein. Furthermore, the terms "comprising" and "having" and any variations thereof are intended to cover non-exclusive inclusion.

In the embodiments of the disclosure, the orientation or position relations indicated by the terms such as "upper", "lower", "inner", "middle", "outer", "front" and "rear" are based on the orientation or position relations shown in the drawings. These terms are primarily intended to better describe the embodiments of the disclosure and their embodiments and are not intended to specify that the indicated device, element or component must have a particular orientation or be constructed and operated in a particular orientation. In addition, some of the above terms may be used to indicate other meanings in addition to orientation or position relations, for example, the term "upper" may also be used to indicate a dependency or connection relation in some cases. The ordinary technicians in the field may understand the specific meanings of these terms in the embodiments of the disclosure on a case-by-case basis.

In addition, the terms "arranged", "connected" and "fixed" should be understood in a broad sense. For example, "connected" can be fixedly connected, detachably connected or integrally constructed; it can be mechanically connected or electrically connected; it can be directly connected or indirectly connected through an intermediary, or connected between two devices, elements or components. The ordinary technicians in the field may understand the specific meanings of the above terms in the embodiments of the disclosure as the case may be.

Unless otherwise stated, the term "a plurality of" means two or more.

It should be noted that the embodiments in the disclosure and the features in the embodiments may be combined with each other without conflict.

Figure 2:
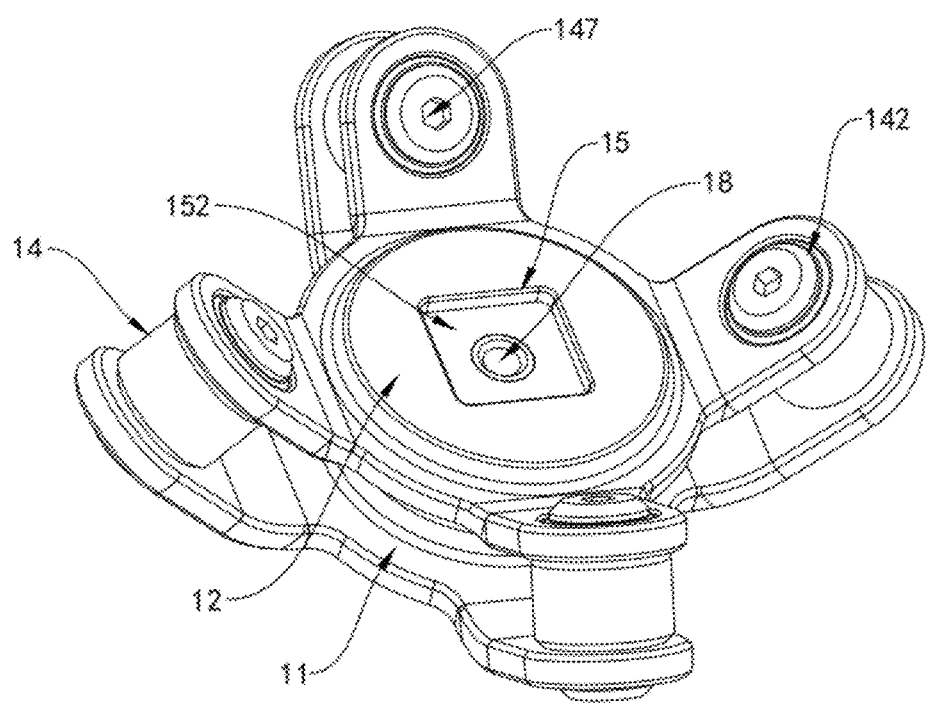
FIG. 2 is the structural diagram for a universal female connector of a shock absorbing device proposed by the utility model.
Figure 3:
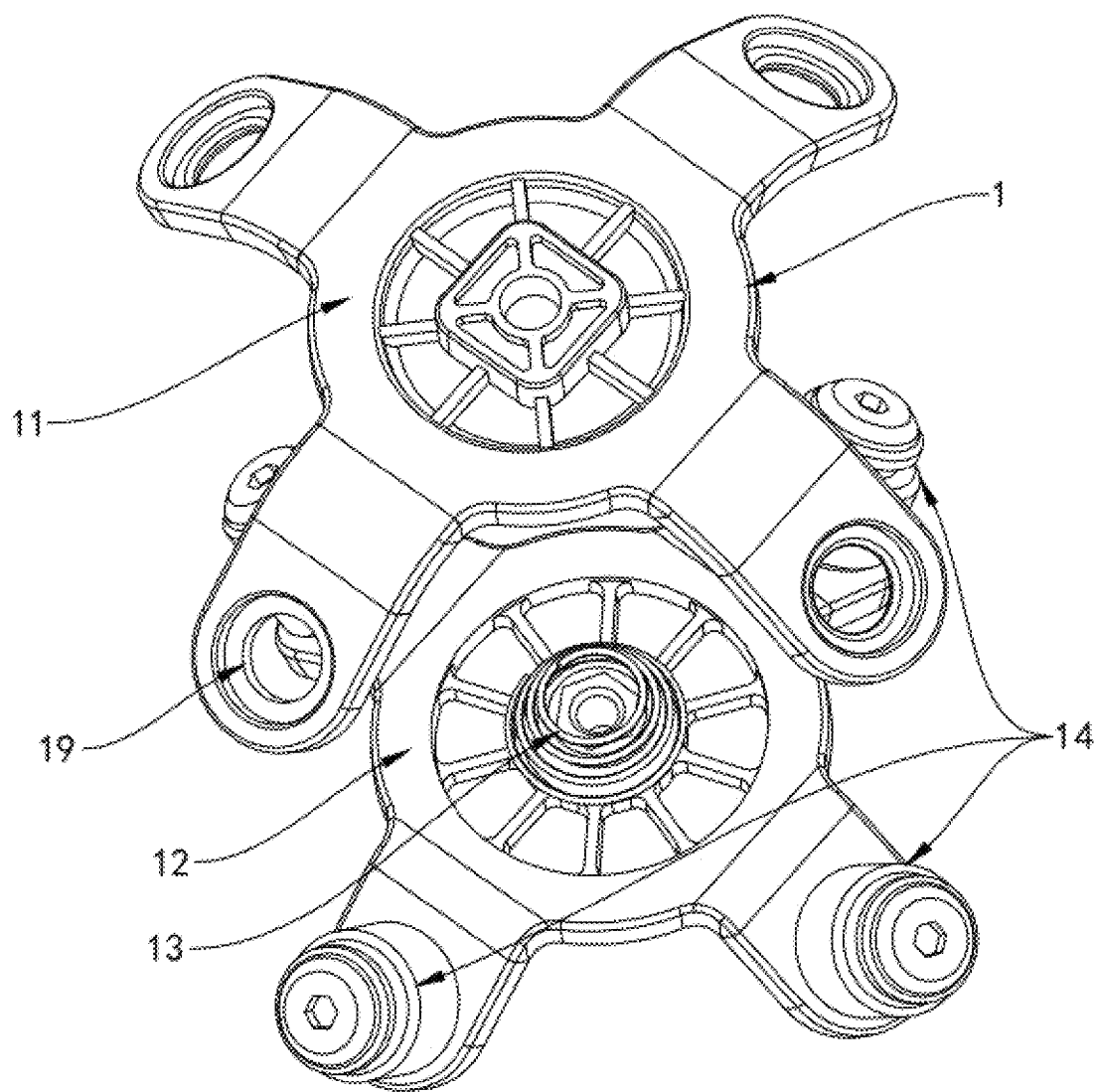
FIG. 3 is the structural diagram for an upper shock absorbing cover of a shock absorbing device proposed by the utility model.
Figure 4:
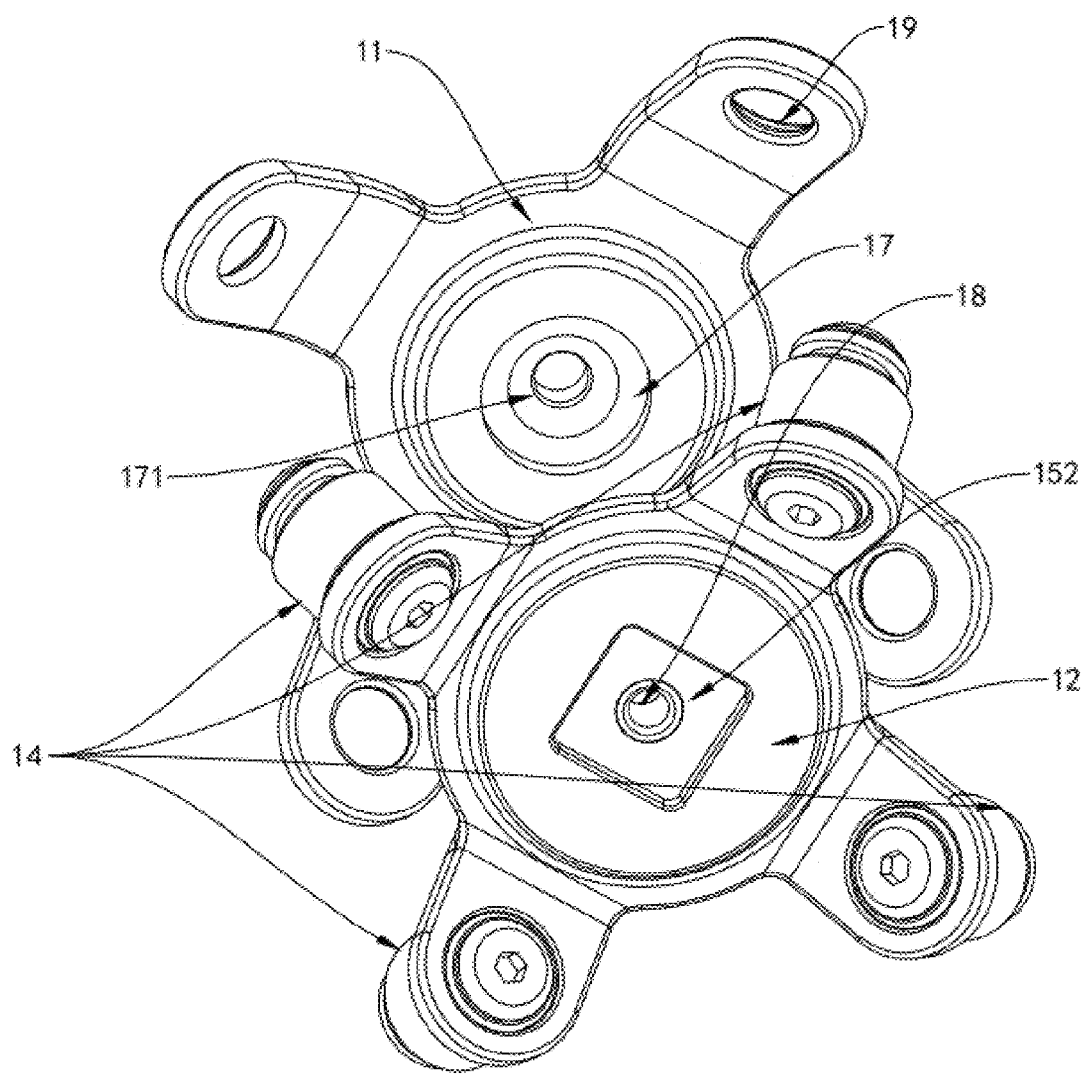
FIG. 4 is the structural diagram for a lower shock absorbing cover of a shock absorbing device proposed by the utility model.
Figure 5:
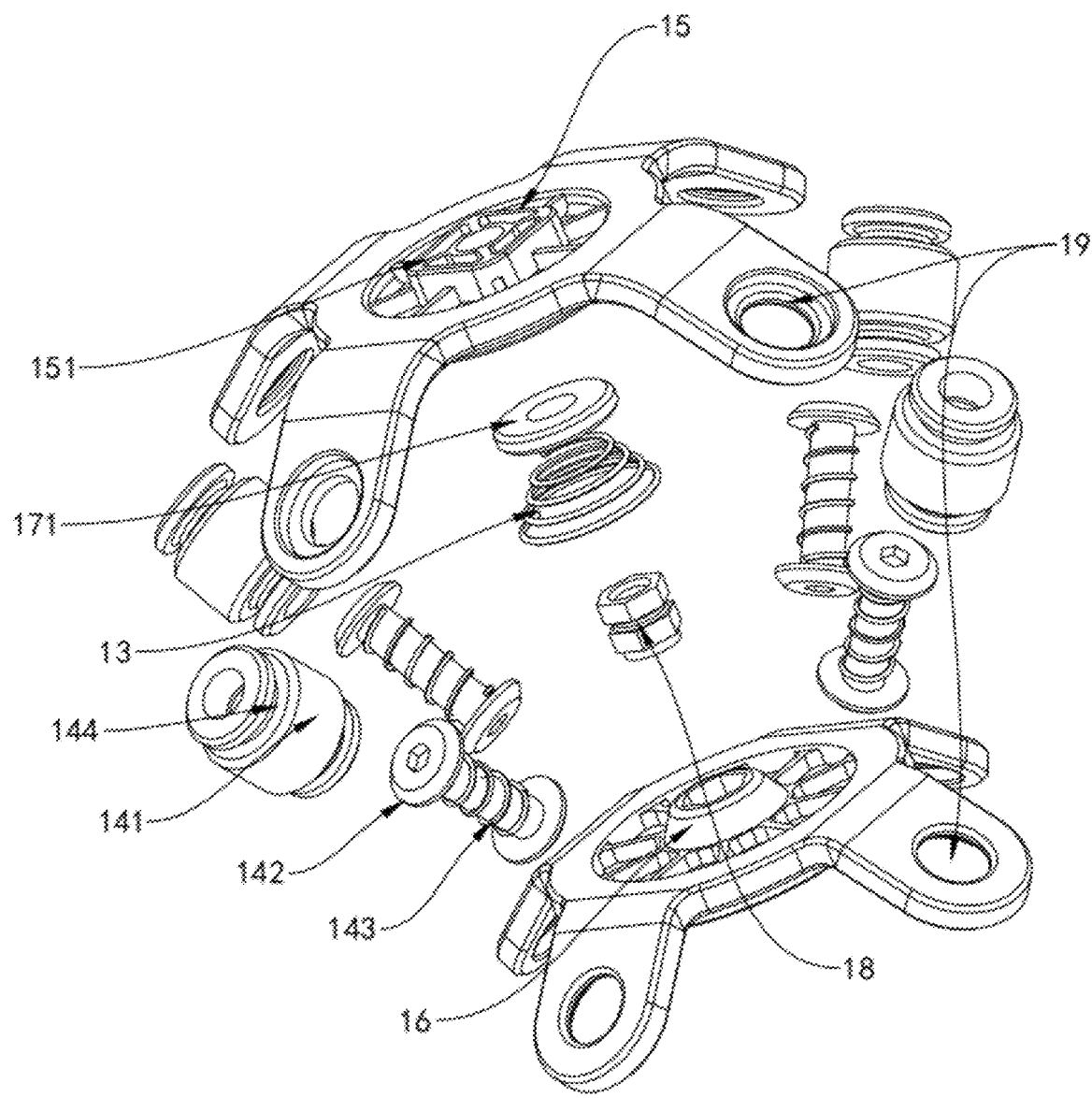
FIG. 5 is the explosive view for a main structure of a shock absorbing device proposed by the utility model.
Figure 6:
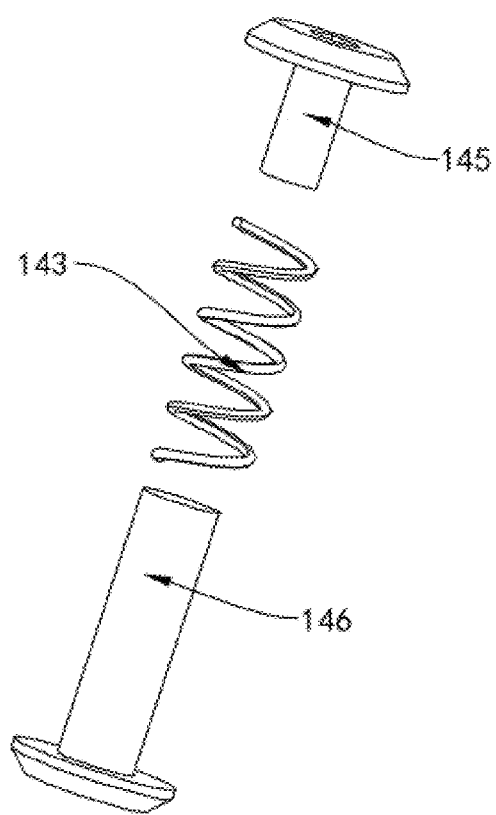
FIG. 6 is the explosive view for a mother and child limit screw structure of a shock absorbing device proposed by the utility model.

As shown in FIG. 1 to FIG. 6, a shock absorbing device comprises a shock absorbing device body 1, which comprises an upper shock absorbing cover 11 and a lower shock absorbing cover 12, a primary shock absorbing element 13 and a secondary shock absorbing element 14 located on the outside of a circle of the primary shock absorbing element 13 are arranged between the upper shock absorbing cover 11 and the lower shock absorbing cover 12, the upper shock absorbing cover 11 and the lower shock absorbing cover 12 are connected with each other through the secondary shock absorbing element 14, and universal connectors 15 are arranged at the top of the upper shock absorbing cover 11 and the bottom of the lower shock absorbing cover 12.

As a specific technical proposal of the embodiment, the primary shock absorbing element 13 is a tower spring, which is characterized by small volume, large load and variable stiffness and is widely used in shock absorbing scenes with small space and large load; the tower spring can produce large deformation when absorbing shock energy, and consume and disperse shock energy to play a role in protecting equipment; the tower spring has high elasticity to quickly restore to the original state, which is suitable for scenes with frequent shocks; due to the structural characteristics of the tower spring, the same spring stiffness can be achieved by reducing the overall thickness of the spring, thus reducing the consumption of required spring materials and reducing costs.

As a specific technical proposal of the embodiment, the secondary shock absorbing element 14 comprises shock absorbing silicones 141, mother and child limit screws 142 sleeved inside the shock absorbing silicones 141 and shock absorbing springs sleeved outside the mother and child limit screws 142 and located inside the shock absorbing silicones 141, and the shock absorbing springs 143 can assist the shock absorbing silicones 141 to buffer the shock, and can shape the shock absorbing silicones 141, so that the shock absorbing silicones 141 can still maintain good integrity in the shock environment for a long time, and can be quickly restored after deformation.

As a specific technical proposal of the embodiment, annular clamping slots 144 are arranged at both ends of the shock absorbing silicone 141, and the two ends of the shock absorbing silicone 141 are clamped inside the countersunk holes 19 of the upper shock absorbing cover 11 and the lower shock absorbing cover 12 through the annular clamping slot 144.

As a specific technical proposal of the embodiment, the mother and child limit screw 142 comprises a mother screw 145 and a child screw 146, the mother screw 145 and the child screw 146 are respectively inserted into the shock absorbing silicone 141 from both ends of the shock absorbing silicone 141 and then riveted for fixing, and can also be fixed by threaded sockets for later disassembly using a hexagonal screwdriver, nuts of the mother screw 145 and the child screw 146 are respectively stuck at both ends of the shock absorbing silicone 141, and a hexagonal socket 147 is arranged inside the nut to ensure that the mother screw 145 and the child screw 146 can be unscrewed by inserting the hexagonal screwdriver into the hexagonal socket 147.

As a specific technical proposal of the embodiment, the universal connector 15 comprises a universal male connector 151 arranged at the top of the upper shock absorbing cover 11 and a universal female connector 152 arranged at the bottom of the lower shock absorbing cover 12, the universal male connector 151 is matched with the universal female connector 152 and can be connected with the universal female connector 152 on a support, and the universal female connector 152 can also be connected with the universal male connector 151 on a universal support ball, thereby being more convenient and faster to assemble.

As a specific technical proposal of the embodiment, a conical boss 16 is arranged at the top of the lower shock absorbing cover 12, and the bottom of the primary shock absorbing element 13 is movably clamped with the conical boss 16, and the conical boss is used to locate the bottom of the tower spring and locate the top of the tower spring through the stepped hole 17, thus further ensuring the assembly stability of the tower spring.

As a specific technical proposal of the embodiment, a stepped hole 17 is arranged at the bottom of the upper shock absorbing cover 11, a flat gasket 171 is arranged inside the stepped hole 17, and the top of the primary shock absorbing element 13 extends to the inside of the stepped hole 17, and the stepped hole 17 and the flat gasket 171 are used to make the screw pass through and connected with the nut 18 of an intelligent device support or other support accessories through the universal male connector 151.

As a specific technical proposal of the embodiment, a nut 18 is fixedly embedded inside the universal female connector 152, and the nut 18 is used to connect the screw on the support ball or other support accessories through the universal female connector 152.

As a specific technical proposal of the embodiment, countersunk holes 19 sleeved with the annular clamping slots 144 at both ends of the shock absorbing silicone 141 respectively are arranged inside support arms around the upper shock absorbing cover 11 and the lower shock absorbing cover 12, at least three supporting arms are arranged around the upper shock absorbing cover 11 and the lower shock absorbing cover 12, and three, four or more supporting arms can be arranged; the countersunk hole 19 can effectively jam the annular clamping slot 144, thereby ensuring the assembly stability of the shock absorbing silicone 141; the annular clamping slot 144 ensures that the upper shock absorbing cover 11 and the lower shock absorbing cover 12 are not directly connected with the mother and child limit screws 142, but are connected with the mother and child limit screws 142 through the shock absorbing silicones 141, thereby avoiding the rigid shock transfer between the upper shock absorbing cover 11 and the lower shock absorbing cover 12, providing better shock absorbing effect, effectively protecting the intelligent device on the support, reducing the shock damage, and being safer during use.

During use, the top of the upper shock absorbing cover 11 is used by making the screw pass through the stepped hole 17 and the flat gasket 171 and connecting the nut 18 of the intelligent device support or other support accessories through the universal male connector 151, the bottom of the lower shock absorbing cover 12 is used by connecting the nut 18 with the screw on the support ball or other support accessories through the universal female connector 152, and the rigid shock of the lower shock absorbing cover 12 is transferred to the upper shock absorbing cover 11 after buffering by the tower spring, the shock absorbing silicone 141 and the shock absorbing spring 143, which can greatly reduce the shock and protect the intelligent device on the top support of the upper shock absorbing cover 11 from damage.

To sum up, for the shock absorbing device, the tower spring is matched with a plurality of shock absorbing silicones 141 to effectively reduce the shock transfer between the upper shock absorbing cover 11 and the lower shock absorbing cover 12; the upper shock absorbing cover 11 and the lower shock absorbing cover 12 the upper shock absorbing cover and the lower shock absorbing cover are not directly connected with the mother and child limit screws 142, but are connected with the mother and child limit screws 142 through the shock absorbing silicones to avoid rigid shock transfer between the upper shock absorbing cover 11 and the lower shock absorbing cover 12 and provide better shock absorbing effect; the shock absorbing spring can assist the shock absorbing silicones 141 to buffer the shock and shape the shock absorbing silicones 141, so that the shock absorbing silicones 141 can still maintain good integrity in the shock environment for a long time, and can be quickly restored after deformation, thereby being more durable in use and meeting the use requirements of the users.

The embodiments of the disclosure are shown sufficiently in the above descriptions and the drawings to enable the technicians in the field to practice them. Other embodiments may include structural changes as well as other changes. Embodiments represent possible changes only. Individual parts and functions are optional unless explicitly required, and the operation sequence can vary. Parts and features of some embodiments may be included in or substituted for parts and features of other embodiments. The embodiments of the disclosure are not limited to the structures described above and shown in the drawings, and may be subject to various modifications and changes within their scope. The scope of the disclosure is limited only by the attached claims.

The invention claimed is:
1. A shock absorbing device, comprising:
a shock absorbing device body (1) comprising an upper shock absorbing cover (11), a lower shock absorbing cover (12), a primary shock absorbing element (13), a universal connector (15) arranged at a top of the upper shock absorbing cover (11) and a bottom of the lower shock absorbing cover (12), and a plurality of secondary shock absorbing elements (14) disposed around the primary shock absorbing element (13) and arranged between the upper shock absorbing cover (11) and the lower shock absorbing cover (12);
wherein the upper shock absorbing cover (11) and the lower shock absorbing cover (12) are connected together through the secondary shock absorbing elements (14); and
wherein each of the secondary shock absorbing elements (14) comprise a shock absorbing silicone (141), a mother and child limit screw (142) sleeved inside the shock absorbing silicone (141), and a shock absorbing spring (143) sleeved on the mother and child limit screw (142) and disposed inside the shock absorbing silicone (141).

2. The shock absorbing device of claim 1, further comprising two annular clamping slots (144) arranged at both ends of the shock absorbing silicone (141) respectively.

3. The shock absorbing device of claim 2, further comprising a plurality of countersunk holes (19) sleeved with the annular clamping slots (144) at both ends of the shock absorbing silicone (141) respectively and arranged around the upper shock absorbing cover (11) and the lower shock absorbing cover (12).

4. The shock absorbing device of claim 1, wherein the mother and child limit screw (142) comprises a mother screw (145) and a child screw (146); wherein the mother screw (145) and the child screw (146) are respectively inserted into the shock absorbing silicone (141) from both ends of the shock absorbing silicone (141) and fastened, and heads of the mother screw (145) and the child screw (146) are respectively stuck at both ends of the shock absorbing silicone (141); and wherein the mother and child limit screw (142) further comprises two hexagonal sockets (147) disposed in the heads of the mother screw (145) and the child screw (146) respectively.

5. The shock absorbing device of claim 1, further comprising a stepped hole (17) arranged at a bottom of the upper shock absorbing cover (11), and a flat gasket (171) arranged inside the stepped hole (17); wherein a top of the primary shock absorbing element (13) extends into the stepped hole (17).

\* \* \* \* \*